(12) United States Patent
Dennis et al.

(10) Patent No.: US 8,873,036 B2
(45) Date of Patent: Oct. 28, 2014

(54) OPTICAL DEVICES AND SYSTEMS FOR USE IN SPECTROSCOPY

(75) Inventors: Andrew Colm Dennis, Jordanstown (IE); David Mark Thompson, Holywood (IE)

(73) Assignee: Perkinelmer Ltd., Seer Green (GB)

( * ) Notice: Subject to any disclaimer, the term of this patent is extended or adjusted under 35 U.S.C. 154(b) by 0 days.

(21) Appl. No.: 12/471,787

(22) Filed: May 26, 2009

(65) Prior Publication Data
US 2010/0110422 A1  May 6, 2010

Related U.S. Application Data

(60) Provisional application No. 61/056,685, filed on May 28, 2008, provisional application No. 61/058,151, filed on Jun. 2, 2008.

(51) Int. Cl.
*G01J 3/44* (2006.01)

(52) U.S. Cl.
USPC .......................................... 356/301

(58) Field of Classification Search
USPC ............... 356/301, 72–73, 417; 250/458.1
See application file for complete search history.

(56) References Cited

U.S. PATENT DOCUMENTS

| | | |
|---|---|---|
| 5,418,797 A | 5/1995 | Bashkansky et al. |
| 7,505,129 B2 * | 3/2009 | Marrow et al. ............... 356/301 |
| 2006/0033910 A1 | 2/2006 | Sun et al. |
| 2006/0238745 A1 * | 10/2006 | Hashimoto et al. ............ 356/73 |
| 2006/0262300 A1 | 11/2006 | Gylys et al. |
| 2007/0215816 A1 | 9/2007 | Hui et al. |
| 2007/0216898 A1 | 9/2007 | Gardner |

* cited by examiner

*Primary Examiner* — Tarifur Chowdhury
*Assistant Examiner* — Abdullahi Nur
(74) *Attorney, Agent, or Firm* — Lando & Anastasi, LLP

(57) ABSTRACT

Certain examples described herein are directed to optical devices and systems for use in spectroscopy. In particular, certain embodiments described herein are directed to devices and methods that may separate excitation light and Raman optical pathways, prior to sample irradiation, so that, if desired, the excitation light and the Raman scattered radiation may be independently manipulated.

11 Claims, 5 Drawing Sheets

US 8,873,036 B2

OPTICAL DEVICES AND SYSTEMS FOR USE IN SPECTROSCOPY

PRIORITY APPLICATIONS

This application claims priority to U.S. Patent Application No. 61/056,685 filed an May 28, 2008 and to U.S. Patent Application No. 61/058,151 filed on Jun. 2, 2008, the entire disclosure of each of which is hereby incorporated herein by reference in its entirety.

TECHNOLOGICAL FIELD

Certain embodiments disclosed herein relate generally to optical systems. More particularly, certain embodiments disclosed herein relate to optical devices and systems that include separated optical pathways for use in Raman scattering and other optical measurements.

BACKGROUND

When light passes through a transparent medium, the light may be scattered in all directions. Two common light scattering phenomena are Rayleigh scattering and Raman scattering. In Rayleigh scattering, the light is scattered by molecules whose dimensions are smaller than the wavelength of radiation. The blueness of the sky, which results from the greater scattering of shorter wavelengths of the visible spectrum, is an example of Rayleigh scattering.

In Raman scattering, the wavelength of the scattered light is shifted from the wavelength of the incident light. The exact shifts in wavelength depend on the chemical structure of the medium or sample scattering the light. Raman lines having wavelengths higher than the incident wavelength are referred to as anti-Stokes lines and those having wavelengths lower than the incident wavelengths are referred to as Stokes lines. The intensities of Raman lines can be 0.001% or less when compared to the intensity of the incident light. Thus, detection of Raman scattering remains difficult.

SUMMARY

In one aspect, a spectroscopic system comprising an excitation source and a plurality of optical elements is provided. In certain examples, the system comprises a first optical element optically coupled to the excitation source and operative as a beam combiner. In some examples, the system includes a second optical element optically coupled to the first optical element to receive light from the first optical element along a first region of a common optical pathway, the second optical element configured to separate the light from the excitation source from the common optical pathway. In other examples, the system may include a third optical element optically coupled to the second optical element and configured to receive the separated light from the second optical element. In addition examples, the system may include a fourth optical element optically coupled to the third optical element and configured to receive the separated light from the third optical element to provide the received light to a sample space along a second region of the common optical pathway, the fourth optical element further configured to receive Raman scattered radiation from a sample in the sample space and to provide the Raman scattered radiation to a detector.

In certain embodiments, the fourth optical element may be optically coupled to the second optical element and the first optical element to provide the Raman scattered radiation to the detector at an angle that is about 180 degrees from the angle of the provided received light. In some embodiments, the system may comprise a fifth optical element in an optical path between the fourth optical element and the second optical element, the fifth optical element configured to manipulate the Raman scattered radiation. In certain examples, the manipulation may be one or more of expanding, contracting, shaping, attenuating, polarizing, depolarizing, redirecting, filtering, displacing, temporally stretching or temporally compressing the Raman scattered radiation. In some examples, the second optical element can be a beam splitter, a spot mirror, a dielectric filter/mirror, a dichroic filter/mirror, a holographic filter/mirror or combinations thereof. In other examples, the first and fourth optical elements may each be beam combiners. In certain examples, the system may comprise a sixth optical element in an optical path between the third optical element and the fourth optical element, the sixth optical element configured to perform one or more manipulations on the light from the excitation source. In some examples, the manipulation may be one or more of expanding, contracting, shaping, attenuating, polarizing, depolarizing, redirecting, displacing, temporally stretching or temporally compressing the Raman scattered radiation. In certain embodiments, the detector can be a photomultiplier tube, a charge-coupled device, a photovoltaic cell, a phototube, a photoconductivity detector, a silicon diode detector, a linear photodiode array, or a vidicon. In some examples, the excitation source can be a solid state laser, a gas laser, a dye laser, an arc lamp, or a vapor lamp. In certain examples, the excitation source may be configured to be pulsed. In some examples, the system may further comprise at least one additional optical element between the third optical element and the fourth optical element, the at least one additional optical element configured to receive light from the third optical element and provide the received light to the fourth optical element.

In another aspect, a spectroscopic system comprising means for providing light to a sample space along a common optical pathway to permit Raman scattering of the provided light by a sample in the sample space to provide Raman scattered radiation is provided. In some examples, the system may include optical means in the common optical pathway, the optical means configured to separate the provided light and the Raman scattered radiation from the common optical pathway to permit individual manipulation of the provided light and the Raman scattered radiation. In other examples, the system may include means for detecting the Raman scattered radiation.

In certain embodiments, the means for providing light can be a solid state laser, a gas laser, a dye laser, an arc lamp, or a vapor lamp. In other embodiments, the optical means comprises a plurality of optical elements, in which at least one optical element of the plurality of optical elements is configured as a beam combiner and at least another optical element of the plurality of optical elements is configured as a beam splitter. In certain examples, the means for detecting the Raman scattered radiation may be a photomultiplier tube, a charge-coupled device, a photovoltaic cell, a phototube, a photoconductivity detector, a silicon diode detector, a linear photodiode array or a vidicon. In some examples, the optical means may further comprise a first optical element configured to manipulate the provided light prior to the provided light being incident on the sample space, and a second optical element configured to manipulate the Raman scattered radiation prior to the Raman scattered radiation being provided to the means for detecting.

In an additional aspect, a method comprising separating excitation light and Raman scattered radiation along a common optical pathway prior to irradiation of a sample with the excitation light to provide the Raman scattered radiation is disclosed.

In certain embodiments, the separating step comprises separating the excitation light from the common optical pathway using a first optical element and a second optical element optically coupled to the first optical element, the first optical element operative as a beam combiner and the second optical element operative as a beam splitter. In other examples, the method may further comprise directing the separated excitation light using a third optical element and a fourth optical element to provide the separated excitation light back to the common optical pathway. In some examples, the method may further comprise manipulating the separated excitation light prior to providing the separated excitation light to the third optical element. In additional examples, the manipulating step may comprise one or more of expanding, contracting, shaping, attenuating, polarizing, depolarizing, redirecting, filtering, displacing, temporally stretching or temporally compressing the excitation light. In some examples, the method may further comprise directing the Raman scattered radiation to a detector using the fourth, second and first optical elements. In other examples, the method may further comprise manipulating the Raman scattered radiation using an optical element in an optical path between the fourth and second optical elements. In some examples, the manipulating step may comprise one or more of expanding, contracting, shaping, attenuating, polarizing, depolarizing, redirecting, filtering, displacing, temporally stretching or temporally compressing the Raman scattered radiation.

In another aspect, a kit comprising a module and instructions for using the module is provided. In some examples, the module may be configured to be used in a spectroscopic system, and may be configured to separate excitation light and Raman scattered radiation along a common optical pathway prior to irradiation of a sample with the excitation light to provide the Raman scattered radiation.

In certain embodiments, the module may comprise a plurality of optical elements. In certain examples, the plurality of optical elements comprise a first optical element configured to be optically coupled to an excitation source and operative as a beam combiner, a second optical element optically coupled to the first optical element and configured to receive light from the first optical element along a first region of a common optical pathway, the second optical element configured to separate the light from the excitation source from the common optical pathway, a third optical element optically coupled to the second optical element and configured to receive the separated light from the second optical element, and a fourth optical element optically coupled to the third optical element and configured to receive the separated light from the third optical element to provide the received light to a sample space along a second region of the common optical pathway, the fourth optical element further configured to receive Raman scattered radiation from a sample in the sample space and to provide the Raman scattered radiation to a detector.

In an additional aspect, a device comprising a first optical element configured to be optically coupled to an excitation source and operative as a beam combiner is provided. In some examples, the device may comprise a second optical element optically coupled to the first optical element and configured to receive light from the first optical element along a first region of a common optical pathway, the second optical element configured to separate the light from the excitation source from the common optical pathway. In other examples, the device may comprise a third optical element optically coupled to the second optical element and configured to receive the separated light from the second optical element. In certain examples, the device may comprise a fourth optical element optically coupled to the third optical element and configured to receive the separated light from the third optical element to provide the received light to a sample space along a second region of the common optical pathway, the fourth optical element further configured to receive Raman scattered radiation from a sample in the sample space and to provide the Raman scattered radiation to a detector.

In certain embodiments, the fourth optical element may also be optically coupled to the second optical element and the first optical element to provide the Raman scattered radiation to the detector at an angle that is about 180 degrees from the angle of the provided received light. In some embodiments, the device may also comprise a fifth optical element in an optical path between the fourth optical element and the second optical element, the fifth optical element configured to manipulate the Raman scattered radiation. In certain embodiments, the manipulation may be one or more of expanding, contracting, shaping, attenuating, polarizing, depolarizing, redirecting, filtering, displacing, temporally stretching or temporally compressing the Raman scattered radiation. In some examples, the second optical element can be a beam splitter, a spot mirror, a dielectric filter/mirror, a dichroic filter/mirror, a holographic filter/mirror or combinations thereof. In other examples, the first and fourth optical elements may each be beam combiners. In certain examples, the device may also comprise a sixth optical element in an optical path between the third optical element and the fourth optical element, the sixth optical element configured to perform one or more manipulations on light from the excitation source. In some examples, the manipulation may be one or more of expanding, contracting, shaping, attenuating, polarizing, depolarizing, redirecting, displacing, temporally stretching or temporally compressing the light from the excitation source. In other examples, the device may further comprise at least one additional optical element between the third optical element and the fourth optical element, the at least one additional optical element configured to receive light from the third optical element and provide the received light to the fourth optical element.

In an additional aspect, a device comprising a first optical element configured to be optically coupled to an excitation source and operative as a beam combiner, and a second optical element optically coupled to the first optical element and configured to receive light from the first optical element along a first region of a common optical pathway, the second optical element configured to separate the light from the excitation source from the common optical pathway is provided. In some examples, the device may also comprise a third optical element optically coupled to the second optical element and configured to receive the separated light from the second optical element and to provide the light to a sample space to permit Raman scattering of the light by a sample in the sample space to provide Raman scattered radiation, wherein the second optical element is further configured to receive the Raman scattered radiation and provide the Raman scattered radiation to a detector.

In certain embodiments, the device may further comprise a fourth optical element in an optical path between the third optical element and the sample space, the fourth optical element configured to manipulate the Raman scattered radiation. In some examples, the manipulation may be one or more of expanding, contracting, shaping, attenuating, polarizing, depolarizing, redirecting, filtering, displacing, temporally stretching or temporally compressing the Raman scattered radiation. In certain examples, the second optical element can be a beam splitter, a spot mirror, a dielectric filter/mirror, a dichroic filter/mirror, a holographic filter/mirror or combinations thereof. In some examples, the device may further comprise a fifth optical element in an optical path between the third optical element and the sample space, the fifth optical element configured to perform one or more manipulations on light from the excitation source. In certain embodiments, the manipulation may be one or more of expanding, contracting, shaping, attenuating, polarizing, depolarizing, redirecting, displacing, temporally stretching or temporally compressing the Raman scattered radiation.

Additional aspects, examples, embodiments and features are described in more detail below.

BRIEF DESCRIPTION OF THE FIGURES

Certain examples are described below with reference to the accompanying figures in which.

Figure 1:
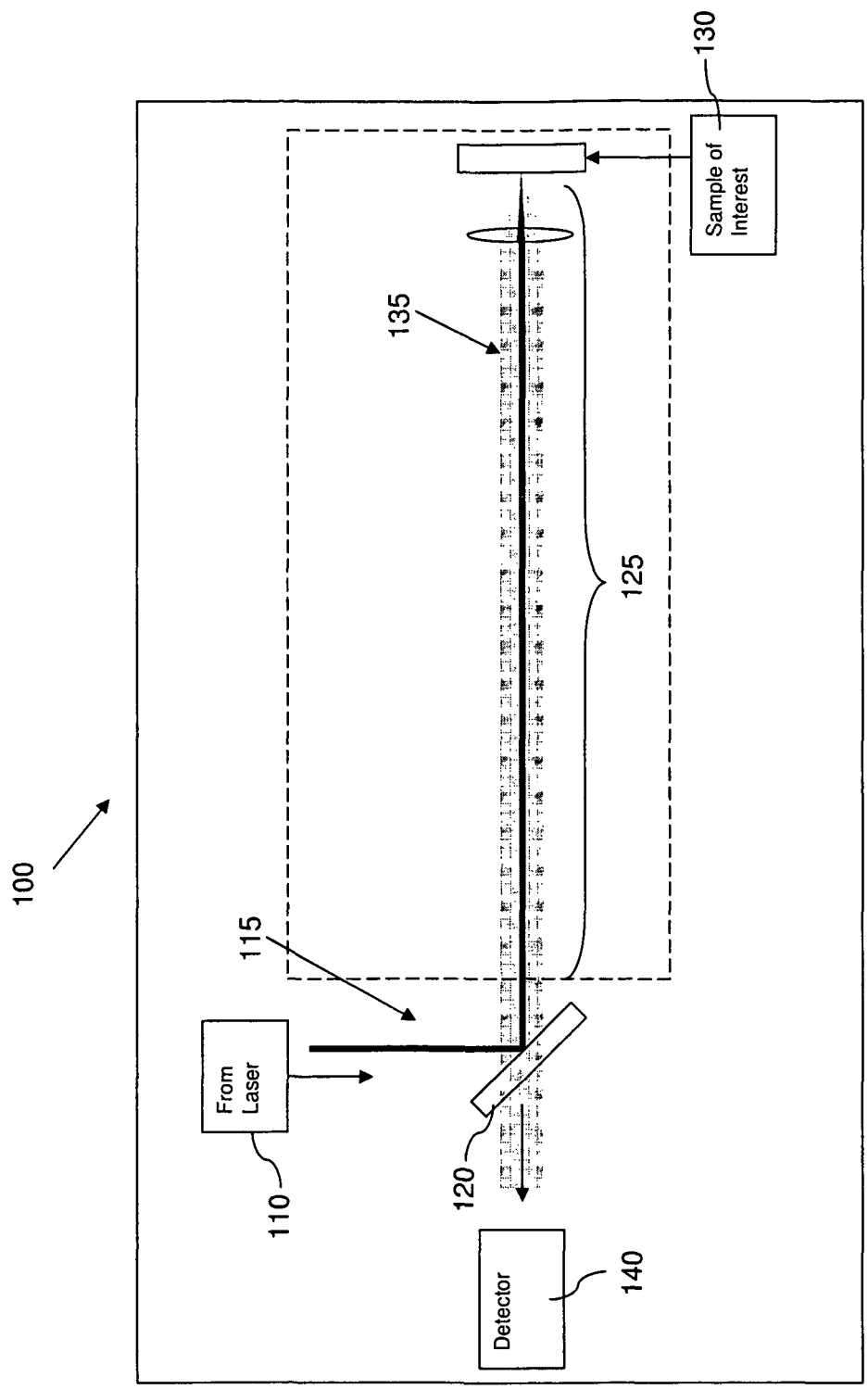
FIG. 1 is a schematic of a spectroscopic system suitable for use, for example, in performing Raman scattering measurements, in accordance with certain examples.

While the optical paths shown in the figures may be represented as a physical component in the figures, this representation is provided merely for enhancing the clarity of the description of the technology disclosed herein. In addition, the thicknesses of the lines and the illustrative angles between various components of the figures are not required or to scale, and any angle between the components of 1-179 degrees may typically be used depending on the desired measurement and/or analysis. Also, while the term laser light is used in reference to FIGS. 1-5, light sources other than laser light may be used, and illustrative light sources are described herein.

DETAILED DESCRIPTION

Certain illustrative embodiments are described below to illustrate some of the uses, advantages and features of the technology described herein. While the figures are shown as including certain optical elements, one or more of these optical elements may be omitted depending on the desired analysis to be performed. In addition, one or more optical elements may be added to the components shown in the figures depending on the desired analysis to be performed.

In existing Raman instruments, the instruments are configured with a laser beam that is introduced into a section of an optical pathway (referred to in certain instances as a common optical pathway) using a beam combiner. Laser light travels towards an objective lens, and the laser radiation is incident on a sample. The inelastically scattered radiation (Raman scatter) and elastically scattered radiation (Rayleigh scatter and reflected laser radiation) are collected by this same objective, and this scattered radiation travels down this common optical pathway until a point where the Rayleigh/laser radiation are rejected using a Rayleigh filter. This common optical pathway is a convenient mechanism for the ease of sampling, and allows for various objectives and/or accessories (containing objectives) to be used and samples to be analyzed. This technique is commonly known as a 180° backscattering geometry.

Certain embodiments disclosed herein implement separation of laser and/or Raman radiation from the common optical pathway prior to laser irradiation on a sample. Such separation can provide numerous advantages including, but not limited to, the ability to independently manipulate the various light beams of the system. For example, there may be instances where a user desires a general purpose Raman instrument for the typical types of analyses that are performed using most Raman spectrometers (for example, the types of Raman Instrument developed and sold commercially by PerkinElmer, Inc.). For certain assays, it may be desirable for the laser or Raman light to be independently manipulated. Such independent manipulations includes, but is not limited to, expanding, contracting, shaping, attenuating, polarizing, depolarizing, redirecting, displacing, temporally stretching (e.g., if using pulsed lasers) and/or temporally compressing (e.g., if using pulsed lasers). If independent optical manipulation is desired, then certain embodiments described herein may be configured to separate the laser and Raman components of the common optical pathway. Following manipulation these components can be recombined, if desired. Illustrative optics and optical configurations for separation of the laser and Raman components are described in more detail below and include, but are not limited to, those implemented as fixed modules that may be placed into the common optical pathway, inside the instrument, or may take the form of a removable sampling accessory that can be inserted into the instrument as desired.

In certain embodiments, a Raman spectrometer is shown for illustrative purposes in FIG. 1. The spectrometer 100 comprises numerous optical components and optical paths. The spectrometer 100 includes a laser 110 optically coupled to a beam combiner 120. The beam combiner 120 is optically coupled to a sample of interest 130 through a common optical pathway 125. Raman radiation from the sample of interest 130 may be back-scattered along Raman path 135 at an angle of about 180 degrees to that of the incident laser radiation. The Raman radiation may be provided along the Raman path 135 to a detector 140 for detection. The configuration shown in FIG. 1 is representative of a typical Raman spectrometer configured for back-scattering where the laser light and the Raman scattered radiation share an optical path—the common optical pathway 125. In this configuration, manipulation of the laser light will also result in manipulation of the Raman scattered radiation due to the sharing of the common optical pathway throughout the optical path of each of the laser light and the Raman scattered radiation.

In certain embodiments, it may be desirable to separate the laser and Raman optical paths from the common optical pathway. Such separation may be accomplished, for example, by inserting one or more optical elements into the common optical pathway. Illustrative optical elements that may be used include, but are not limited to, a beam splitter, a spot mirror, a dielectric filter/mirror, a dichroic filter/mirror, a holographic filter/mirror or similar optical elements or combinations thereof. In some examples, a monochromator/spectrograph may be used.

Figure 2:
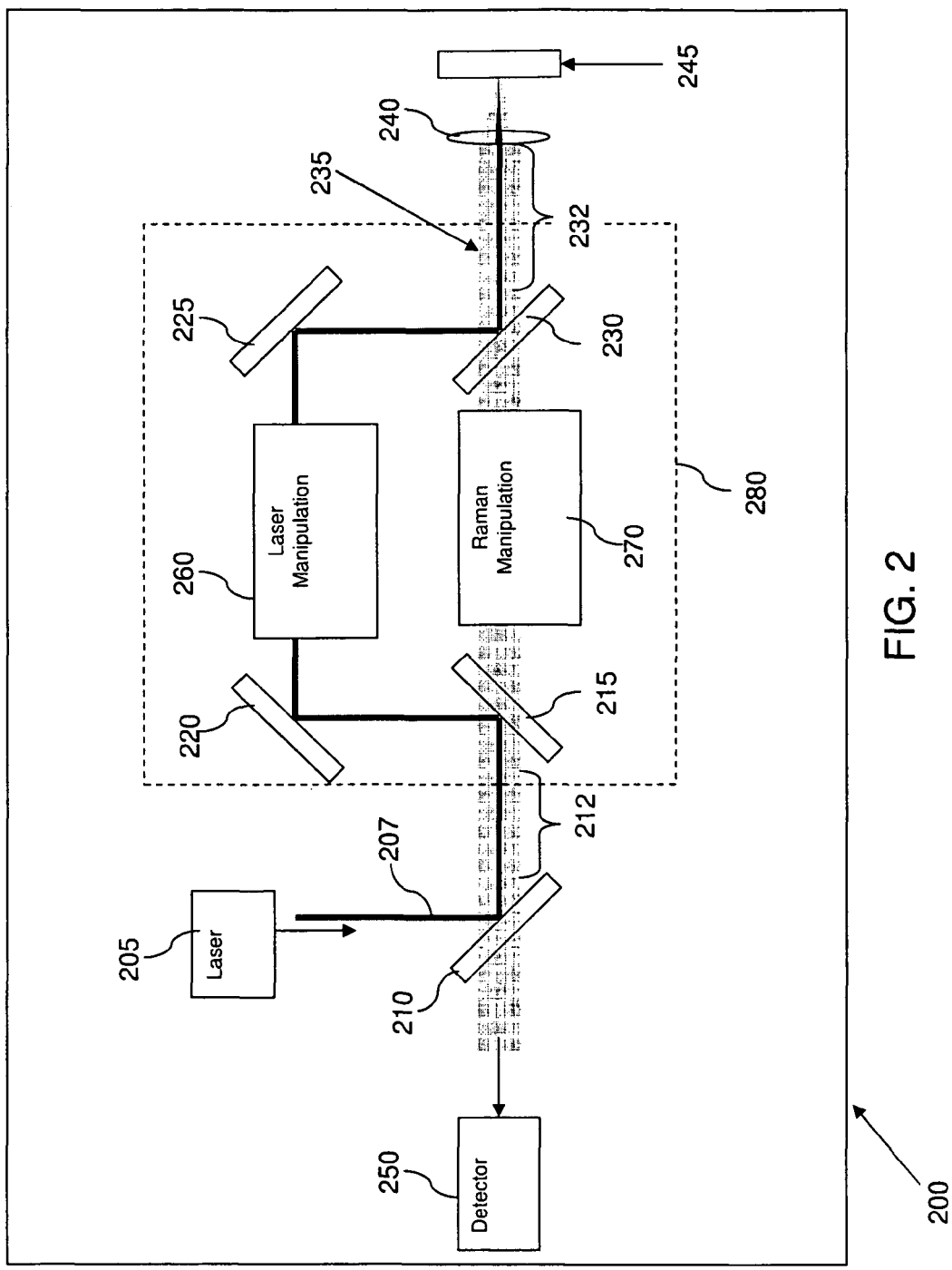
FIG. 2 is a first schematic of a spectroscopic system suitable for use, for example, in performing Raman scattering measurements where the excitation light optical paths and Raman scattering optical paths have been separated, in accordance with certain examples.

One embodiment that is configured to provide separate laser and Raman optical paths is shown in FIG. 2. The spectrometer 200 comprises a laser 205 optically coupled to a first optical element 210 through a laser path 207. In this example, the first optical element 210 is operative as a beam combiner. Illustrative devices that may be used as a beam combiner include, but are not limited to, mirrors, filters and combinations thereof. The first optical element 210 is also optically coupled to a second optical element 215 through a first region 212 of a common optical pathway. The second optical element 215 is configured as a beam separator, and may include any one or more of a beam splitter, a spot mirror, a dielectric filter/mirror, a dichroic filter/mirror, a holographic filter/mirror and combinations thereof. The second optical element 215 is operative to redirect the laser light to a third optical element 220, and thus provide a separate optical path for the laser light. The third optical element 220 may be a mirror or other suitable device that can direct the laser light to another component of the system. In some examples, an additional optical element, such as an optical element 225, may also be present and used to direct the separated laser light back to another region of the common optical pathway. For example, the additional optical element 225 may be used to provide the laser light to a fourth optical element 230, which is operative to recombine the laser light and provide it along a second region 232 of the common optical pathway to an optical element 240 and to a sample space 245. The optical element 240 may be, for example, a lens, a microscope objective, a curved mirror, a fiber optic device or may be absent. Raman scattered radiation from a sample in the sample space 245 may be provided back to the fourth optical element 230 along a Raman path 235. The fourth optical element 230 may pass the received Raman scattered radiation to the second optical element 215 and the first optical element 210 and on to a detector 250.

In certain examples, the system may also include one or more devices or optical elements 260 for manipulation of the laser light. Such manipulations include, but are not limited to, expanding, contracting, shaping, attenuating, polarizing, depolarizing, redirecting, filtering, displacing, temporally stretching or temporally compressing the laser light. Because the optical path between the optical elements 220 and 225 only includes laser light, manipulation of the laser light does not affect the Raman scattered radiation. Similarly, the system may also include one or more devices or optical elements 270 for manipulation of the Raman light. Such manipulations include, but are not limited to, expanding, contracting, shaping, attenuating, polarizing, depolarizing, redirecting, filtering, displacing, temporally stretching or temporally compressing the Raman scattered radiation. Because the optical path between the fourth and second optical elements 230 and 215, respectively, only includes the Raman scattered radiation and not the laser light, manipulation of the Raman scattered radiation does not affect the laser light. The configuration shown in FIG. 2 permits individual tuning and/or manipulation of the laser light and the Raman scattered radiation to provide increased flexibility for performing measurements.

Figure 3:
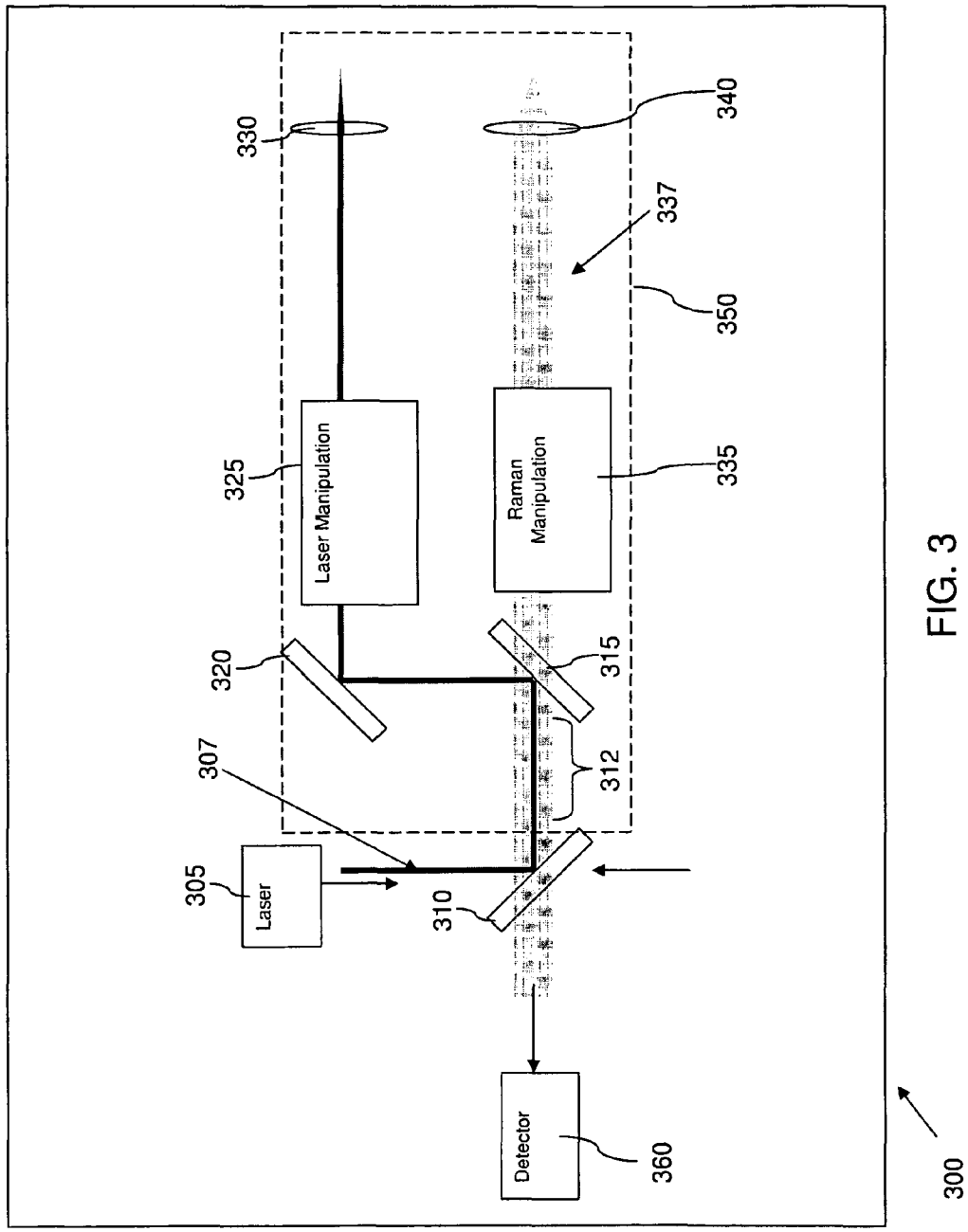
FIG. 3 is another schematic of a spectroscopic system suitable for use, for example, in performing Raman scattering measurements where the excitation light optical paths and Raman scattering optical paths have been separated, in accordance with certain examples.

In certain embodiments, a system configured to provide separate excitation light and Raman optical paths may be implemented where the excitation light is not recombined along a common optical pathway after its separation from the common optical pathway. One illustrative configuration is shown in FIG. 3. The system 300 comprises a laser 305 optically coupled to a first optical element 310 by an optical path 307. In this configuration, the first optical element 310 may be operative as a beam combiner. The first optical element 310 is optically coupled to a second optical element 315 along a first region 312 of a common optical pathway. The second optical element 315 may be configured, for example, as a beam separator to separate laser light from the common optical pathway and provide it to a third optical element 320. The system may optionally include a device 325 for manipulating the laser light, as discussed below. The third optical element 320 may provide light to a sample (not shown) optionally using a lens 330 or other suitable optical element. Lenses 330 and 340 are optional and may be omitted if desired. In the configuration shown in FIG. 3, the laser light is not recombined into the common optical path as shown in the embodiment of FIG. 2. Instead, the laser light is provided to the sample and Raman scattered radiation may be received by the second optical element 315, optionally through one or more additional optical elements (not shown), along an optical path 337. The Raman scattered radiation may be provided to a detector 360 along the common optical path 312. In the configuration shown in FIG. 3, the exact angle that the Raman scattered radiation may be received by the second optical element 315 is not critical, as scattering occurs generally in all directions. Thus, the optical paths may be separated and not recombined, which permits individual manipulation of the laser light and the Raman scattered radiation and simplifies the overall production of the system.

Figure 4:
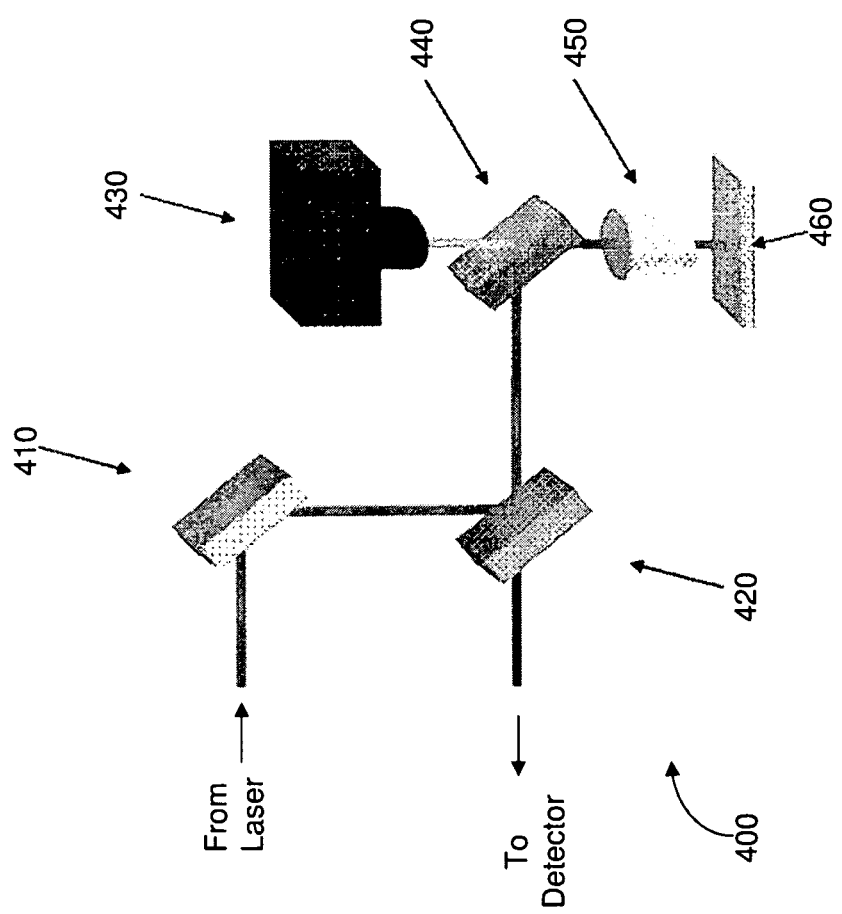
FIGS. 4 and 5 are illustrative configurations of systems, in accordance with certain examples.
Figure 5:
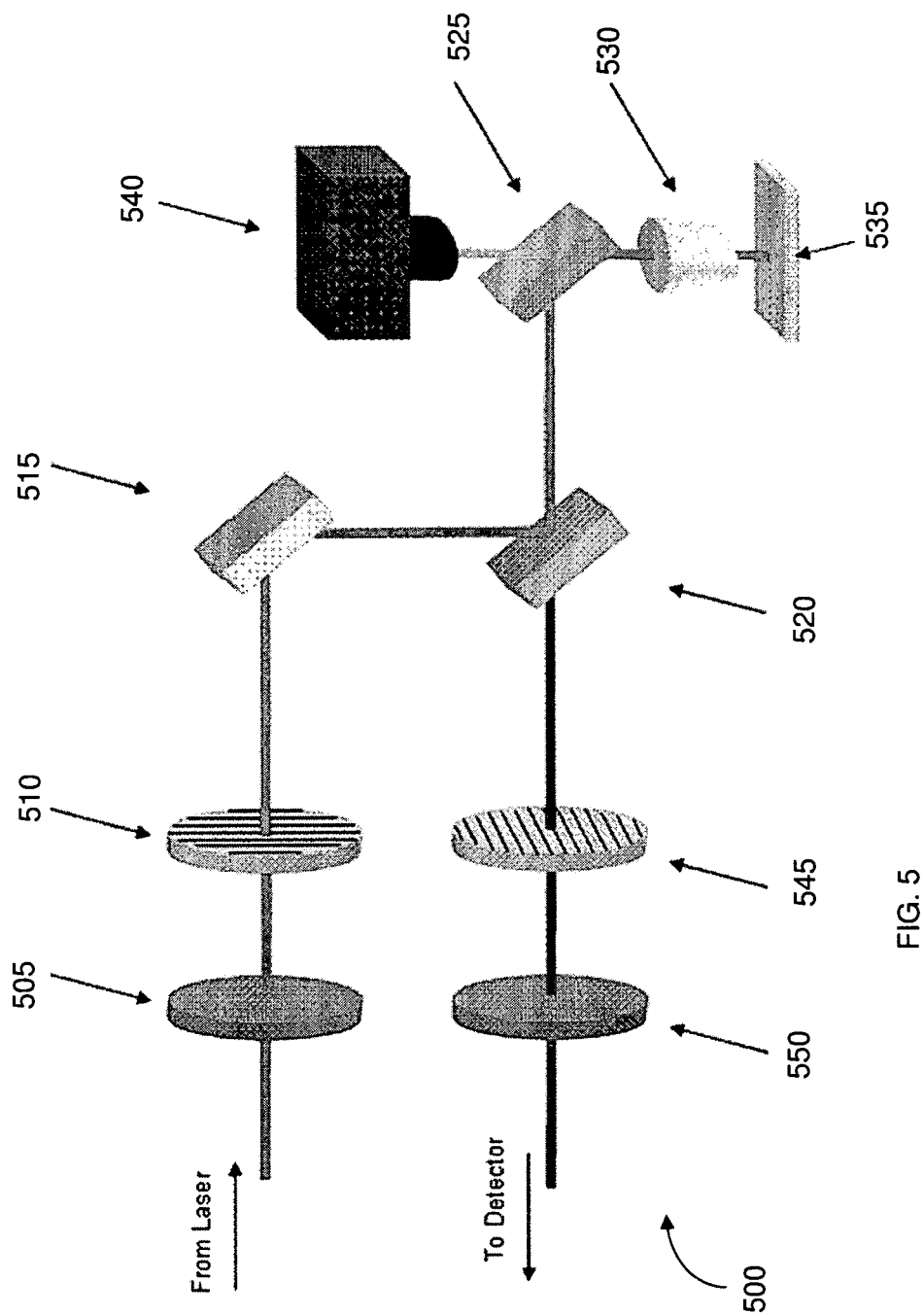

In certain examples, the optical configurations shown in any one or more of FIGS. 1-5 (FIGS. 4 and 5 are described in more detail below) may take the form of an accessory or module that can be placed in existing instruments. For example, the particular optical configuration shown in FIG. 2 may take the form of a module 280, as shown by the dotted lines, which can be placed in existing instruments. The module may include one or more apertures for receiving incident light and/or Raman scattered radiation. In some examples, the module 280 may also include the lens 240 and the sample holder 250. Similarly, a module 350 may be placed into an existing instrument such that a user can replace the existing optical components with the module 350. By configuring the optical elements in the form of an accessory or module, the overall cost can be reduced as an end-user is not required to purchase an entire new instrument.

In some examples, the module includes a device comprising a first optical element configured to be optically coupled to an excitation source and operative as a beam combiner, a second optical element optically coupled to the first optical element and configured to receive light from the first optical element along a first region of a common optical pathway, the second optical element configured to separate the light from the excitation source from the common optical pathway, a third optical element optically coupled to the second optical element and configured to receive the separated light from the second optical element, and a fourth optical element optically coupled to the third optical element and configured to receive the separated light from the third optical element to provide the received light to a sample space along a second region of the common optical pathway, the fourth optical element further configured to receive Raman scattered radiation from a sample in the sample space and to provide the Raman scattered radiation to a detector. In certain configurations of the device, the fourth optical element is also optically coupled to the second optical element and the first optical element to provide the Raman scattered radiation to the detector at an angle that is about 180 degrees from the angle of the provided received light. In certain embodiments, the device may also include a fifth optical element in an optical path between the fourth optical element and the second optical element, the fifth optical element configured to manipulate the Raman scattered radiation. In embodiments configured with the fifth optical element, the manipulation that may be performed includes, but is not limited to, expanding, contracting, shaping, attenuating, polarizing, depolarizing, redirecting, filtering, displacing, temporally stretching or temporally compressing the Raman scattered radiation or combinations thereof. In some embodiments, the second optical element of the device may be a beam splitter, a spot mirror, a dielectric filter/mirror, a dichroic filter/mirror, a holographic filter/mirror or combinations thereof. In certain instances, the first and fourth optical elements of the device may each be beam combiners. In some examples, the device of the module may also comprise a sixth optical element in an optical path between the third optical element and the fourth optical element, the sixth optical element configured to perform one or more manipulations on light from the excitation source. In configurations where the sixth optical element is present, manipulation includes, but is not limited to, expanding, contracting, shaping, attenuating, polarizing, depolarizing, redirecting, displacing, temporally stretching or temporally compressing light from the excitation source. In certain configurations, the device may also include at least one additional optical element between the third optical element and the fourth optical element, the at least one additional optical element configured to receive light from the third optical element and provide the received light to the fourth optical element.

In another illustrative configuration of a module or accessory, the module or accessory may include a device comprising a first optical element configured to be optically coupled to an excitation source and operative as a beam combiner, a second optical element optically coupled to the first optical element and configured to receive light from the first optical element along a first region of a common optical pathway, the second optical element configured to separate the light from the excitation source from the common optical pathway, and a third optical element optically coupled to the second optical element and configured to receive the separated light from the second optical element and to provide the light to a sample space to permit Raman scattering of the light by a sample in the sample space to provide Raman scattered radiation, wherein the second optical element is further configured to receive the Raman scattered radiation and provide the Raman scattered radiation to a detector.

In certain embodiments, the device may also comprise a fourth optical element in an optical path between the third optical element and the sample space, the fourth optical element configured to manipulate the Raman scattered radiation. In examples where a fourth optical element is present, the manipulation includes, but is not limited to, expanding, contracting, shaping, attenuating, polarizing, depolarizing, redirecting, filtering, displacing, temporally stretching or temporally compressing the Raman scattered radiation. In some examples, the second optical element can be a beam splitter, a spot mirror, a dielectric filter/mirror, a dichroic filter/mirror, a holographic filter/mirror or combinations thereof. In certain examples, the device may also include a fifth optical element in an optical path between the third optical element and the sample space, the fifth optical element configured to perform one or more manipulations on light from the excitation source. In examples where a fifth optical element is present, the manipulation includes, but is not limited to, expanding, contracting, shaping, attenuating, polarizing, depolarizing, redirecting, displacing, temporally stretching or temporally compressing the Raman scattered radiation.

In certain embodiments and depending on the exact configuration of the module, it may include one or more suitable interfaces, mechanical couplers, fittings or other suitable components so that the module may be physically coupled to the instrument housing and/or any printed circuit boards of the instrument. The module may include anti-reflective coatings on external surfaces such that stray light may be absorbed and otherwise not interfere with any measurements. In some examples, the module may be sized and arranged such that it can be drop fitted or dropped into an existing instrument after removal of suitable pre-existing components from the instrument. The couplers or fittings on the housing of the module may be selected such that the optical paths of the existing components of the instrument (such as, for example, the optical path of the light source, the optical path of the detector or other component of the system) may be properly aligned with the optical components of the modules simply by coupling the fittings in suitable holes or apertures in the housings of the instrument. For example, the module may be designed such that it is operative with a RamanStation™ 400 Raman spectrometer, a RamanFlex™ 400F Fiber Optic Analyzer, a RamanMicro™ 200 Raman Microscope, each of which are commercially available from PerkinElmer, Inc. (Waltham, Mass.), or other Raman devices commercially available from PerkinElmer, Inc. or other suitable suppliers.

In certain examples, the systems shown in FIGS. 1-5 may include an excitation source, which may or may not be a laser. For example, the excitation source can be a solid state laser, a gas laser, a dye laser, an arc lamp, or a vapor lamp. In some configurations where the excitation source provides a continuous beam of light, a suitable chopper or other device may be placed between the first optical element and the light source to provide for pulsing of the light source. In some examples, the light source may be coupled to one or more fiber optic apertures each of which may be configured to provide light.

The exact type of detector used in the systems disclosed herein may vary depending on the particular type of measurement being performed. Illustrative detectors include, but are not limited to, a photomultiplier tube, a charge-coupled device, a photovoltaic cell, a phototube, a photoconductivity detector, a silicon diode detector, a linear photodiode array, or a vidicon. Any of these detectors may be coupled to a fiber optic array, or other suitable device including one or more fiber optic apertures, to provide light to the detector.

In certain embodiments, the systems disclosed herein may be used for optical analyses other than Raman measurements. For example, light emissions from fluorescence or phosphorescence may also be monitored using the configurations described herein. In addition, the configurations shown and described herein permit the use of a single instrument for a variety of different Raman techniques. For example, the configurations may be used for polarized Raman measurements, where typically a laser polarizer and Raman polarization analyzer are placed in the main optical part of the instrument in the laser and Raman paths, respectively. In other examples, the configurations may also be used for Spatially Offset Raman Spectroscopy (SORS), which may include a bespoke optical configuration. The configuration may also be used for transmission Raman, which allows the laser to be sent into the sample and the Raman spectrum to be acquired from the opposite side, or at some other desired angle.

In accordance with certain examples, the instrument configurations described herein may be controlled or used with, at least in part, a computer system. The computer systems may be, for example, general-purpose computers such as those based on Unix, Intel PENTIUM-type processor, Motorola PowerPC, Sun UltraSPARC, Hewlett-Packard PA-RISC processors, or any other type of processor. It should be appreciated that one or more of any type computer system may be used according to various embodiments of the technology. Further, the system may be located on a single computer or may be distributed among a plurality of computers attached by a communications network. A general-purpose computer system according to one embodiment may be configured to perform any of the described functions including but not limited to: data acquisition, angle tuning of the optical elements, data analysis and the like. It should be appreciated that the system may perform other functions, including network communication, and the technology is not limited to having any particular function or set of functions.

For example, various aspects may be implemented as specialized software executing in a general-purpose computer system. The computer system may include a processor connected to one or more memory devices, such as a disk drive, memory, or other device for storing data. The memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system typically is electrically coupled to an interface on the system such that electrical signals may be provided from the system to the computer system for storage and/or processing.

In certain examples, the computer system may also include one or more input devices, for example, a keyboard, mouse, trackball, microphone, touch screen, and one or more output devices, for example, a printing device, status or other LEDs, display screen, speaker. In addition, the computer system may contain one or more interfaces that connect the computer system to a communication network (in addition or as an alternative to the interconnection mechanism). The storage system of the computer typically includes a computer readable and writeable nonvolatile recording medium in which signals are stored that define a program to be executed by the processor or information stored on or in the medium to be processed by the program. For example, the sampling rates and times may be stored on the medium. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in storage system or in a memory system. The processor generally manipulates the data within the integrated circuit memory and then copies the data to the medium after processing is completed. A variety of mechanisms are known for managing data movement between the medium and the integrated circuit memory element, and the technology is not limited thereto. The technology is not limited to a particular memory system or storage system.

The computer system may also include specially-programmed, special-purpose hardware, for example, an application-specific integrated circuit (ASIC). Aspects of the technology may be implemented in software, hardware or firmware, or any combination thereof. Further, such methods, acts, systems, system elements and components thereof may be implemented as part of the computer system described above or as an independent component.

In some examples, the computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP or Windows Vista operating systems available from the Microsoft Corporation, MAC OS System X operating system available from Apple Computer, the Solaris operating system available from Sun Microsystems, or UNIX or Linux operating systems available from various sources. Many other operating systems may be used. In addition or alternative to a processor, the computer system may include a controller such as for example and 8-bit or 16-bit controller. Other controllers such as 32-bit or higher controller may also be used in place of a processor or in addition to the processor of the computer system.

The processor and operating system together define a computer platform for which application programs in high-level programming languages can be written. It should be understood that the technology is not limited to a particular computer system platform, processor, operating system, or network. Also, it should be apparent to those skilled in the art that the present technology is not limited to a specific programming language or computer system. Further, it should be appreciated that other appropriate programming languages and other appropriate computer systems could also be used.

In certain examples, the hardware or software is configured to implement cognitive architecture, neural networks or other suitable implementations. For example, desired emission or scattering wavelengths may be stored in the system and used where a desired assay or measurement is to be performed. Such a configuration permits recall of known parameters for use in successive measurements, which can simplify the functionality and increase the overall ease of use by an end user.

One or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

Various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various aspects may be implemented in a non-programmed environment (e.g., documents created in HTML, XML or other format that, when viewed in a window of a browser program, render aspects of a graphical-user interface (GUI) or perform other functions). Various aspects may be implemented as programmed or non-programmed elements, or any combination thereof.

In certain examples, a user interface may be provided such that a user may enter desired parameters such as, for example, the excitation light wavelength, the emission or scattering wavelength, the number of sampling points, slit widths and the like. Other features for inclusion in a user interface will be readily selected by the person of ordinary skill in the art, given the benefit of this disclosure.

In accordance with certain examples, the devices and systems disclosed herein may be used to detect light emission and/or scattering from many different types of assays. Illustrative assays include, but are not limited to, fluorescent assays, solid phase assays, chemical reactions, binding assays, hybridization assays, enzymatic assays, clinical diagnostic assays, immunoassays including, but not limited to, ELISA assays, or may be used in analytical measurements and/or the study of electronic structures of molecules.

In some examples, the systems disclosed herein may include additional components such as, for example, an autoloader. The autoloader may be configured to load samples sequentially into and out of the system such that the system may perform measurements without user intervention or monitoring. The autoloader may comprise, for example, a robotic arm and/or motor that can securely grip the samples and load them into a desired position in the system. The system may include other electrical components such as operational amplifiers, gain control devices and the like. The system may include a bar code reader so that each sample may be encoded with a bar code and the measurements of each sample can be associated with its respective bar code. Additional components and features for including in the devices and systems disclosed herein will be readily selected by the person of ordinary skill in the art, given the benefit of this disclosure.

In certain embodiments, the configurations disclosed herein may be packaged in the form of a kit which includes the optical module or accessory and optionally includes instructions for using the module or accessory. In certain examples, the module of the kit may include a plurality of optical elements including, but not limited to, those described in reference to FIGS. 2 and 3, for example. In some examples, the plurality of optical elements comprise a first optical element configured to be optically coupled to an excitation source and operative as a beam combiner, a second optical element optically coupled to the first optical element and configured to receive light from the first optical element along a first region of a common optical pathway, the second optical element configured to separate the light from the excitation source from the common optical pathway, a third optical element optically coupled to the second optical element and configured to receive the separated light from the second optical element, and a fourth optical element optically coupled to the third optical element and configured to receive the separated light from the third optical element to provide the received light to a sample space along a second region of the common optical pathway, the fourth optical element further configured to receive Raman scattered radiation from a sample in the sample space and to provide the Raman scattered radiation to a detector.

In certain examples, a method comprising separating an excitation light and Raman scattered radiation along a common optical pathway prior to irradiation of a sample with the excitation light to provide the Raman scattered radiation is disclosed. In some examples, the separating step comprises separating the excitation light from the common optical pathway using a first optical element and a second optical element optically coupled to the first optical element, the first optical element operative as a beam combiner and the second optical element operative as a beam splitter. In other examples, the method may further include directing the separated excitation light using a third optical element and a fourth optical element to provide the separated excitation light back to the common optical pathway. In additional examples, the method may further comprise manipulating the separated excitation light prior to providing the separated excitation light to the third optical element. In some examples, the manipulating step comprises one or more of expanding, contracting, shaping, attenuating, polarizing, depolarizing, redirecting, filtering, displacing, temporally stretching or temporally compressing the excitation light. In certain examples, the method may further comprise directing the Raman scattered radiation to a detector using the fourth, second and first optical elements. In some examples, the method may further comprise manipulating the Raman scattered radiation using an optical element in an optical path between the fourth and second optical elements. In certain embodiments, the manipulating step comprises one or more of expanding, contracting, shaping, attenuating, polarizing, depolarizing, redirecting, filtering, displacing, temporally stretching or temporally compressing the Raman scattered radiation.

Certain specific examples are described below to facilitate a better understanding of the technology described herein.

EXAMPLE 1

An illustrative device is shown in FIG. 4. The device 400 comprises a mirror 410, a beam combiner 420, a camera 430 (for example, a video camera), a dielectric mirror 440, an objective lens 450 and a sample 460. Laser light is incident on the mirror 410 and provided to the beam combiner 420. The beam combiner 420 provides the light to dielectric mirror 440. The dielectric mirror 440 provides the light to the objective lens 450 and onto the sample 460. The sample 460 may emit or scatter light or radiation, which can be sent to the camera 430 and/or to a detector (not shown) using optical elements 450, 440 and 420. For example, Raman scattered radiation may be provided to the objective lens 450 and to the dielectric mirror 440. The radiation may then be provided to the beam combiner 420 and to a detector through, for example, a common optical pathway. Additional optical elements for use in the system shown in FIG. 4 will be readily selected by the person of ordinary skill in the art, given the benefit of this disclosure.

EXAMPLE 2

Another illustrative device is shown in FIG. 5. The device 500 comprises a depolarizer 505, an adjustable laser polarizer 510 (which may be omitted if desired), a mirror 515, a beam combiner 520, a dielectric mirror 525, an objective lens 530, a sample 535, a camera 540 (for example, a video camera), an adjustable Raman polarizer 545 (which may be omitted if desired) and a depolarizer 550. Laser light is incident on the depolarizer 505 and adjustable laser polarizer 510, and a desired polarity of light may be provided to mirror 515 and onto the beam combiner 520. The beam combiner 520 provides the light to dielectric mirror 525. The dielectric mirror 525 provides the light to the objective lens 530 and onto the sample 535. The sample 535 may emit or scatter light or radiation, which can be sent to the camera 540 and/or to a detector (not shown) using optical elements 520, 525, 530, 545 and 550. For example, Raman scattered radiation may be provided to the objective lens 530 and to the dielectric mirror 525. The radiation may then be provided to the beam combiner 520, to the adjustable Raman polarizer 545 and the depolarizer 550 prior to the scattered radiation being provided to the detector. Additional optical elements for use in the system shown in FIG. 5 will be readily selected by the person of ordinary skill in the art, given the benefit of this disclosure.

When introducing elements of the examples disclosed herein, the articles "a," "an," and "the" are intended to mean that there are one or more of the elements. The terms "comprising," "including" and "having" are intended to be open ended and mean that there may be additional elements other than the listed elements. It will be recognized by the person of ordinary skill in the art, given the benefit of this disclosure, that various components of the examples can be interchanged or substituted with various components in other examples.

Although certain features, aspects, examples and embodiments have been described above, additions, substitutions, modifications, and alterations of the disclosed illustrative features, aspects, examples and embodiments will be readily recognized by the person of ordinary skill in the art, given the benefit of this disclosure.

What is claimed is:

1. A spectroscopic system, comprising: an excitation source configured to provide single-wavelength light in a first direction; a first optical element optically coupled to the excitation source and operative as a beam combiner; a second optical element optically coupled to the first optical element to receive light from the first optical element along a first region of a common optical pathway that includes inelastically scattered radiation returning from a sample in a second direction that is opposite the first direction, the second optical element configured to separate the light from the excitation source from the common optical pathway prior to sample irradiation; a third optical element optically coupled to the second optical element and configured to receive the separated light from the second optical element to provide the received light to a sample space along a second region of the common optical pathway, the third optical element further configured to receive inelastically scattered radiation from the sample in the sample space and to provide the inelastically scattered radiation to a detector; and a fourth optical element in an optical path between the third optical element and the second optical element, the fourth optical element configured to manipulate the inelastically scattered radiation, wherein the third optical element is also optically coupled to the first optical element to provide the inelastically scattered radiation to the detector at an angle that is about 180 degrees from the angle of the provided received light.

2. The spectroscopic system of claim 1, in which the manipulation is one or more of expanding, contracting, shaping, attenuating, polarizing, depolarizing, redirecting, filtering, displacing, temporally stretching or temporally compressing the inelastically scattered radiation.

3. The spectroscopic system of claim 1, in which the second optical element is a beam splitter, a spot mirror, a dielectric filter/mirror, a dichroic filter/mirror, a holographic filter/mirror or combinations thereof.

4. The spectroscopic system of claim 1, in which the first and third optical elements are each beam combiners.

5. The spectroscopic system of claim 1, in which the detector is a photomultiplier tube, a charge-coupled device, a photovoltaic cell, a phototube, a photoconductivity detector, a silicon diode detector, a linear photodiode array, or a vidicon.

6. The spectroscopic system of claim 5, in which the excitation source is a solid state laser, a gas laser, a dye laser, an arc lamp, or a vapor lamp.

7. The spectroscopic system of claim 6, in which the excitation source is configured to be pulsed.

8. A spectroscopic system, comprising: means for providing single-wavelength light to a sample space along a common optical pathway to permit inelastic scattering of the provided light by a sample in the sample space to provide inelastically scattered radiation; optical means for separating the provided light and the inelastically scattered radiation traveling in opposite directions along the common optical pathway to permit individual manipulation prior to sample irradiation of the provided light and the inelastically scattered radiation; means for separately manipulating the provided light prior to the provided light being incident on the sample space; means for separately manipulating the inelastically scattered radiation prior to the inelastically scattered radiation being provided to the means for detecting; and means for detecting the inelastically scattered radiation.

9. The system of claim 8, in which the means for providing light is a solid state laser, a gas laser, a dye laser, an arc lamp, or a vapor lamp.

10. The system of claim 9, in which the optical means comprises a plurality of optical elements, in which at least one optical element of the plurality of optical elements is configured as a beam combiner and at least another optical element of the plurality of optical elements is configured as a beam splitter.

11. The system of claim 10, in which the means for detecting the inelastically scattered radiation is a photomultiplier tube, a charge-coupled device, a photovoltaic cell, a phototube, a photoconductivity detector, a silicon diode detector, a linear photodiode array or a vidicon.

* * * * *